Inventor
Winnett Boyd

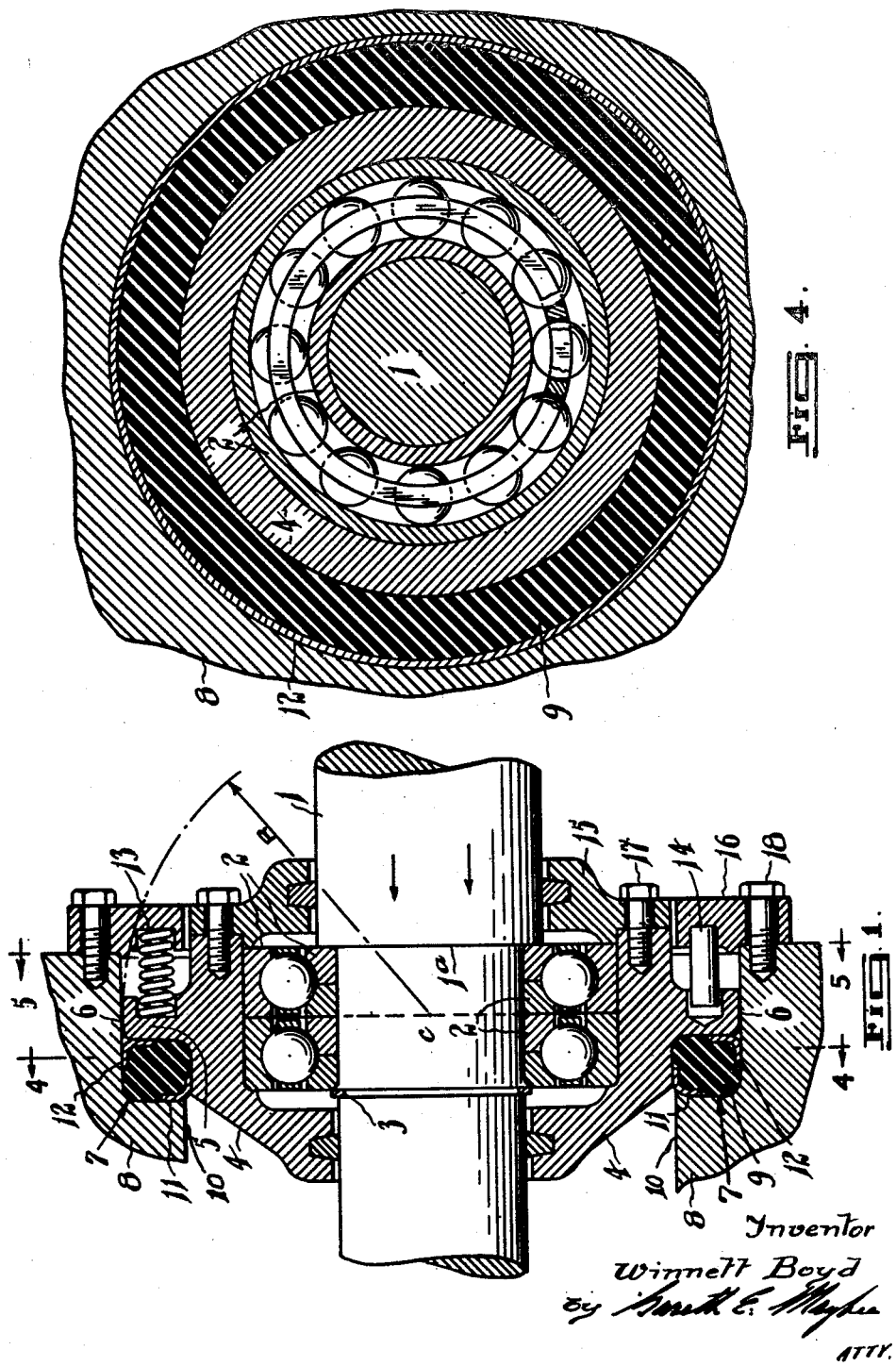

Patented Nov. 14, 1950

2,530,323

UNITED STATES PATENT OFFICE 2,530,323

SELF-ALIGNING BEARING MOUNTING

Winnett Boyd, Bobcaygeon, Ontario, Canada, assignor, by mesne assignments, to Canadian Patents and Development Limited, Ottawa, Ontario, Canada, a company Application June 1, 1948, Serial No. 30,349

2 Claims. (Cl. 308—184)

This invention relates to bearing assemblies and more particularly to the type using ball or roller bearings and requiring self-aligning properties.

In all machinery it is of great importance that the bearings of a common shaft should be accurately aligned and it is desirable that thrust bearings should be capable of accommodating any misalignment caused by minor inaccuracies in the assembly or construction of a machine, deformations due to temperature variation and the like. Consequently these bearings are frequently provided with some self-aligning device such as a spherical housing but under high thrust loads such housings are liable to stick and not to align themselves freely. In addition, provision must be made for adequate lubrication. In this invention the bearing is mounted in a housing which is supported axially on a body of plastic, substantially incompressible material which completely fills a suitably shaped space between the fixed frame of the machine and the housing itself and which is capable of deformation without appreciable decrease in its total volume. The bearing housing may be said to float on this medium to accommodate any misalignment of the shaft. The supporting medium may be a fluid, retained by suitable glands, or it may be a solid plastic or a hollow plastic, filled with fluid. The assembly is comparatively easy to manufacture, is light in weight, will support relatively heavy loads with negligible axial displacement and will require no lubrication or maintenance over long periods of operation. Other objects and advantages of the invention will be apparent during the course of the following description.

In the accompanying drawings forming a part of this application and in which like numerals are employed to designate like parts throughout the same, Fig. 1 is a section through the bearing mounting embodying a supporting element which consists of a solid plastic ring;

Fig. 4 is a section on the line 4—4 in Fig. 1; and

Figure 5:
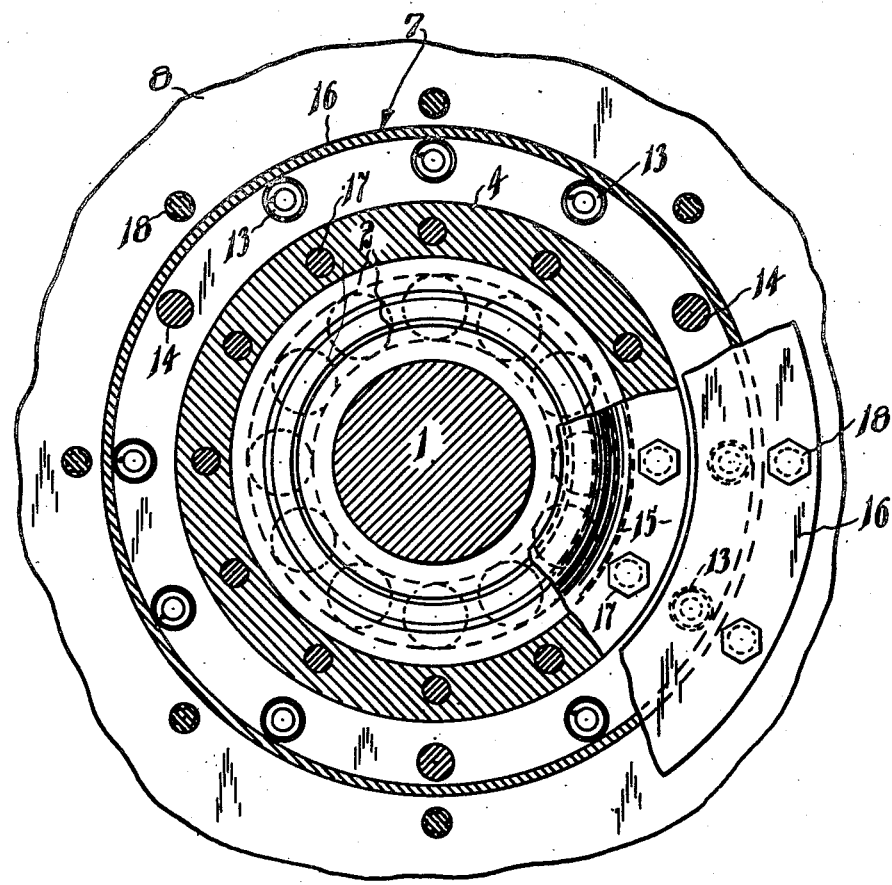
Fig. 5 is a section on the line 5—5 in Fig. 1, with a portion shown in end elevation.

Rotatable shaft 1 is supported in multiple ball bearings 2, 2. The direction of thrust on the shaft is indicated by the arrows in Fig. 1. The thrust is taken by the shoulder 1a which contacts with the side of the inner race of one of the bearings 2. The bearings are retained against this shoulder in conditions of slight reverse load by the circlip 3. The outer race of the bearings is mounted in a housing 4 embodying a flange 5 around its circumference and the outer surface 6 of this flange is an arc having radius R, the centre c of the said arc being at the point of intersection of the centre line of the flange 5 and the axis of the shaft 1. The housing 4 is shown supported radially in a cylindrical recess 7 in the frame 8 which is a fixed part of the body of the machine, the diameter of the recess being sufficient to accommodate the flange 5.

On its thrust face the flange 5 is supported axially on a ring 9 of plastic incompressible material deformable at normal temperatures, such as natural or synthetic rubber, and this ring in turn is supported axially on a shoulder 10 of the frame 8, the depth of the shoulder 10 being approximately equal to the width of the flange 5. The ring 9 completely fills the annular space bounded on the one hand by the floating housing 4 with its flange 5 and on the other hand by the cylindrical recess 7 and the shoulder 10, and it is reinforced by light L-section metal rings 11 and 12 along the lines of discontinuity between the two components, to prevent the plastic material from flowing out of this space under load.

Figures 2, 3:
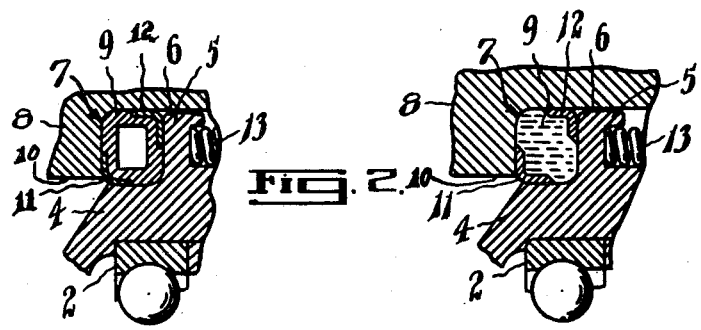
Fig. 2 is a fragmentary section of the supporting element when it takes the form of a hollow ring, filled with fluid.
Fig. 3 is a fragmentary section of the supporting element when it takes the form of a fluid, retained in an enclosed space between the housing and the frame by means of glands.

In Fig. 2 the ring 9 is shown as hollow containing a fluid. In Fig. 3 the ring is shown as composed of a fluid, the rings 11 and 12 acting as glands. Springs 13, the ends of which are supported in holes in the flange 5 and the closure plate 16, are provided to keep the housing 4 with its flange 5 and frame 8 in contact with the plastic ring 9 under conditions of slight reverse load. In addition, pins 14 fitting loosely in holes in the flange 5 and fitting snugly in the closure plate 16 are provided to prevent the housing 4 from creeping in the direction of rotation of the shaft 1. The housing 4 is covered by the closure plate 15 securing the outer race of the bearings 2, and the recess in the frame 8 by the closure plate 16 which carries the springs 13 and the pins 14. Bolts 17 secure closure plate 15 to housing 4 and bolts 18 secure closure plate 16 to the frame 8.

Thrust is transmitted from the shaft 1 directly through the non-self-aligning bearings 2 to the housing 4 and thence through the plastic ring 9 to the frame 8 of the machine. Any small misalignment between the axis of the shaft 1 and the axis of the frame 8 is absorbed by the plastic ring 9 which deforms allowing the shaft 1 to rotate in any direction about the centre of the convex face 6 of the flange 5. Since the plastic ring is substantially incompressible and is entirely confined, no appreciable axial displacement of the shaft 1 relative to the frame 8 will take place.

It is to be understood that the form of my invention, herewith shown and described, is to be taken as a preferred example of the same, and that various changes in the shape, size and arrangement of the parts may be resorted to, without departing from the spirit of my invention.

What I claim as my invention is:

1. A thrust bearing mounting comprising a shaft housing, a machine frame in which the housing is mounted, a body of plastic substantially incompressible material deformable at normal temperatures, said body of plastic material completely filling and being entirely confined in a space between the housing and the frame, and provided with reinforcing members along the lines of discontinuity between the housing and the frame to prevent any tendency for the said body of plastic material to flow therethrough under load, means for holding the housing from rotating relative to the frame, and means for holding the housing and the frame in contact with the plastic body under conditions of slight reverse load.

2. A thrust bearing mounting comprising a shaft housing, a machine frame in which the housing is mounted, a body of plastic substantially incompressible material deformable at normal temperatures, said body of plastic material completely filling and being entirely confined in a space between the housing and the frame, a ring secured to the frame, a plurality of springs compressed between the ring and the housing holding the housing and the frame in contact with the plastic body under conditions of slight reverse load, and a plurality of pins engaging the ring and the housing for holding the housing from rotating relative to the frame.

WINNETT BOYD.

REFERENCES CITED

The following references are of record in the file of this patent:

UNITED STATES PATENTS

| Number | Name | Date |
|---|---|---|
| 826,507 | Holm | July 17, 1906 |
| 828,058 | Schou | Aug. 7, 1926 |
| 1,965,407 | Doughty | July 3, 1934 |

FOREIGN PATENTS

| Number | Country | Date |
|---|---|---|
| 8,806 | Great Britain | 1903 |
| 19,304 | Great Britain | 1911 |
| 264,584 | Italy | May 2, 1929 |